(12) United States Patent
Weng et al.

(10) Patent No.: US 12,211,219 B2
(45) Date of Patent: Jan. 28, 2025

(54) MOVEMENT DIRECTION DETERMINATION SYSTEM AND OBJECT VOLUME COMPUTATION SYSTEM

(71) Applicant: PixArt Imaging Inc., Hsin-Chu (TW)

(72) Inventors: Jeng-Yue Weng, Hsin-Chu (TW); Tzung-Min Su, Hsin-Chu (TW); Feng-Chi Liu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 466 days.

(21) Appl. No.: 17/547,269

(22) Filed: Dec. 10, 2021

(65) Prior Publication Data

US 2022/0245837 A1    Aug. 4, 2022

Related U.S. Application Data

(60) Provisional application No. 63/145,962, filed on Feb. 4, 2021.

(51) Int. Cl.
*G06T 7/292* (2017.01)
*G06T 7/215* (2017.01)

(52) U.S. Cl.
CPC .............. *G06T 7/292* (2017.01); *G06T 7/215* (2017.01); *G06T 2207/10016* (2013.01)

(58) Field of Classification Search
CPC ...................... G06T 7/292; G06T 7/215; G06T 2207/10016; G06T 2207/30232; G06T 7/20; G06T 7/579; G06V 10/147; G06V 40/23; G01F 17/00; A63F 9/0204; A63F 9/0208; G01P 13/02

See application file for complete search history.

(56) References Cited

U.S. PATENT DOCUMENTS

| 11,350,060 | B1 * | 5/2022 | Mitura ................... G06T 7/246 |
| 2019/0108396 | A1 * | 4/2019 | Dal Mutto ............ G06V 20/52 |
| 2021/0272296 | A1 * | 9/2021 | Mirza .................... G06V 20/52 |

FOREIGN PATENT DOCUMENTS

EP    3722747 A2 * 10/2020

* cited by examiner

*Primary Examiner* — Chan S Park
*Assistant Examiner* — Daniel C Chang
(74) *Attorney, Agent, or Firm* — Winston Hsu

(57) ABSTRACT

Disclosed in a movement direction determination system comprising a first detection region, a second detection region and a processing circuit. The first detection region and the second detection region respectively comprises an optical sensor. The processing circuit determines a movement direction of an object according to the optical data generated by the first detection region and the second detection region. The present invention also discloses a movement direction determination system using a single detection region. The present invention also discloses an object volume computation system which can compute an object volume according to sensed optical data. The disclosed movement direction determination system can be used for various applications and the object volume computation system can assist product confirmation.

7 Claims, 12 Drawing Sheets

MOVEMENT DIRECTION DETERMINATION SYSTEM AND OBJECT VOLUME COMPUTATION SYSTEM

CROSS REFERENCE TO RELATED APPLICATIONS

This application claims the benefit of U.S. Provisional Application No. 63/145,962, filed on Feb. 4, 2021, the contents of which are incorporated herein by reference.

BACKGROUND OF THE INVENTION

1. Field of the Invention

The present invention relates to a movement direction determination system and an object volume computation system, and particularly relates to a movement direction determination system and an object volume computation system which use optical data.

2. Description of the Prior Art

In recent years, an optical touch control device becomes more and more popular. However, a conventional optical touch control device only has touch sensing function in a 2D manner but could not detect the object in a 3D environment. Also, the application of the conventional optical touch control device is always limited to use a finger or a touch pen, due to the structure of the conventional optical touch control device.

Besides, unstaffed stores also become more and more popular in recent years. However, such unstaffed stores always have no secure product confirmation mechanism. Therefore, a client may use the barcode reader to scan a cheap product but put an expensive product into the shopping cart, to get the expensive good by a lower price.

Therefore, new systems for solving above-mentioned problems are needed.

SUMMARY OF THE INVENTION

One objective of the present invention is to provide a movement direction estimation system which can determine a movement direction of an object and can be used for various applications.

Another objective of the present invention is to provide an object volume computation system which can compute a volume of an object, to assist the product confirmation.

One embodiment of the present invention provides a movement direction determination system comprising a first detection region, a second detection region and a processing circuit. The first detection region comprises a first optical sensor configured to sense first optical data. The second detection region comprises a second optical sensor configured to sense second optical data. The processing circuit is configured to determine a movement direction of an object according to the first optical data and the second optical data, after at least partial of the object moves into the first detection region and the second detection region, or after at least partial of the object passes through the first detection region and the second detection region.

Another embodiment of the present invention provides a movement direction determination system comprising a detection region and a processing circuit. The detection region comprises a first reflective strip; at least one optical sensor, configured to sense optical data generated based on reflected light from the first reflective strip, wherein the optical data comprises a first part corresponding to the first reflective strip, a second part and a third part, wherein the second part and the third part are at different sides of the first part. The processing circuit is configured to determine a movement direction of an object according to relations between object optical data in the optical data and the first part, the second part, third part.

Still another embodiment of the present invention provides an object volume computation system, for computing a volume of an object when the object passed a detection area, comprising: a processing circuit; at least one object sensing device, configured to sense first optical data of the object, wherein the object sensing device generates information representing an area of the object according to the first optical data; and an object motion sensor, configured to compute movement information which corresponds to the object moves across the detection area. The processing circuit further computes a distance between the object and the optical motion sensor based on the first optical data, computes a height of the object according to the distance and the movement information, and acquires the volume based on the area and the height.

In view of above-mentioned embodiments, movement direction determination systems which can determine a movement direction of the object or an incident angle of the object are provided. Such movement direction determination systems can be used in various scenarios since the arrangement thereof can be freely changed. Besides, the object volume computation system provided by the present invention can be used in an unstaffed store, to enhance to product confirming mechanism.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Figure 1:
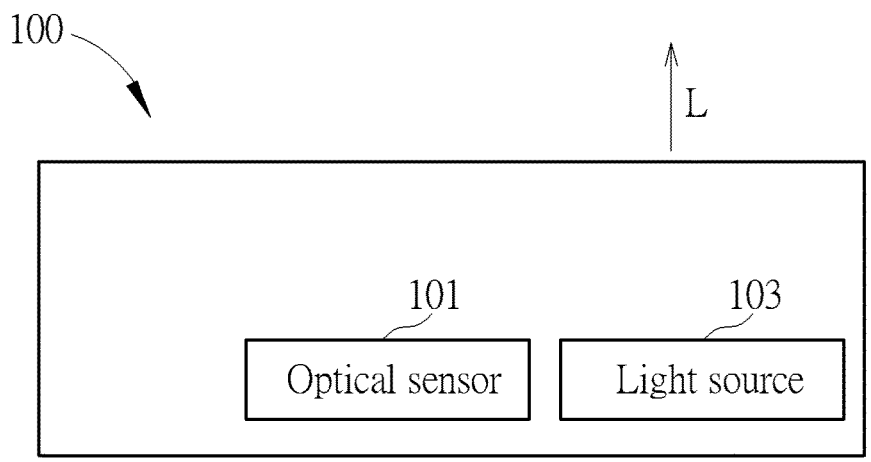
FIG. 1 is a block diagram illustrating an optical device according to one embodiment of the present invention.

FIG. 1 is a block diagram illustrating an optical device 100 according to one embodiment of the present invention. As illustrated in FIG. 1, the optical device 100 comprises an optical sensor 101 and a light source 103. The light source 103 is configured to emit light L outward. Also, the optical sensor 101 is configured to sense optical data generated based on reflected light of the light emitted from the light source 103. In one embodiment, the optical sensor 101 is an image sensor and the optical data is at least one image. However, the optical data can be data comprise optical features such as light intensities or light distribution.

Figure 2:
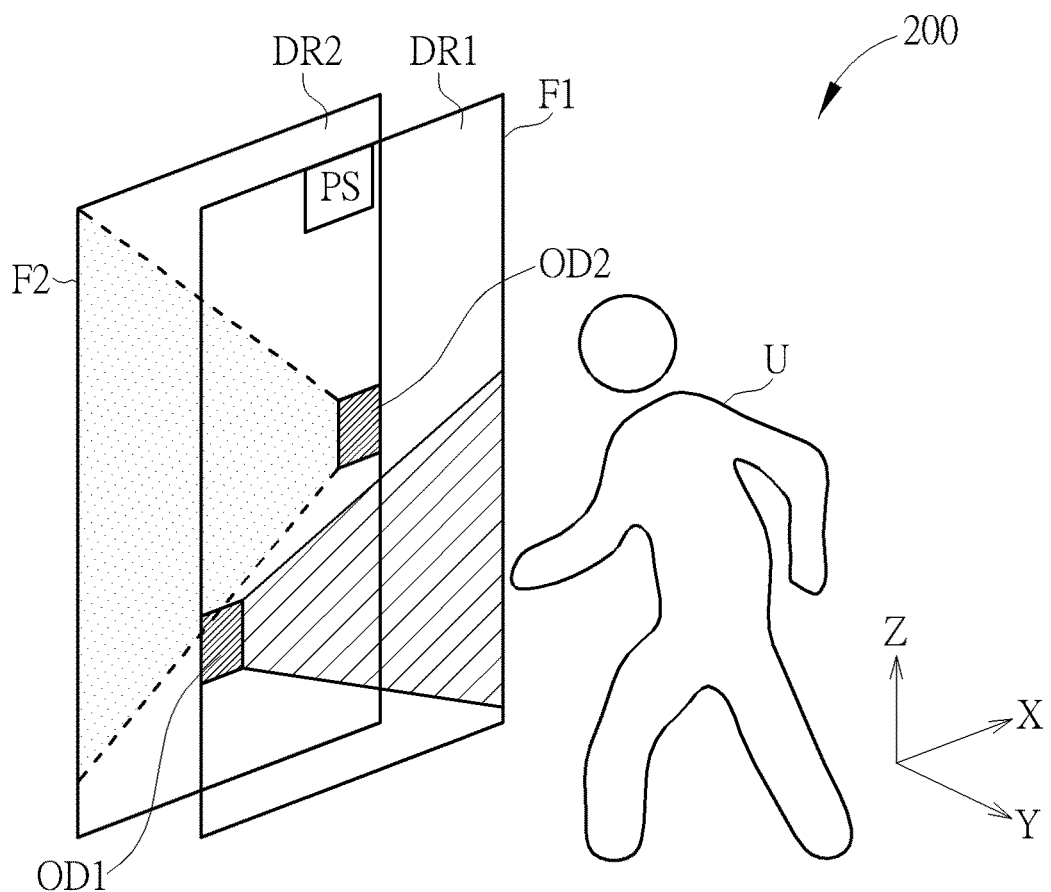
FIG. 2 is a schematic diagram illustrating a movement direction determination system according to one embodiment of the present invention.

FIG. 2 is a schematic diagram illustrating a movement direction determination system 200 according to one embodiment of the present invention. As illustrated in FIG. 2, the movement direction determination system 200 comprises a first detection region DR1 and a second detection region DR2. The first detection region DR1 comprises a first optical device OD1. Also, the second detection region DR2 comprises a second optical device OD2. Therefore, when at least part of the user U is in the first detection region DR1, the user U can be optically detected by the first optical device OD1. For example, the first optical data sensed by the first optical sensor OD1 becomes bright, thus a processing circuit PS of the movement direction determination system 200, which can communicate with the first optical device OD1 and the second optical device OD2, can determine that at least part of the user U is in the first detection region DR1 based on the first optical data. Please note, the processing circuit mentioned here and in following embodiments can be a circuit or a chip independent from the first optical device OD1 and the second optical device OD2. However, the processing circuit can also be integrated in the first optical device OD1 or the second optical device OD2.

The above-mentioned "optically detected" can have different meanings corresponding to different embodiments. If the first optical device OD1 or the second optical device OD2 have the structures illustrated in FIG. 1, that is, at least one light source is provided therein, the "optically detected" can mean the user reflects the light from the light source, thus the user can be optically detected if a light intensity of the reflected light increases.

In another embodiment, the light source can be provided opposite to the optical sensor. By this way, the optical sensor directly senses the optical data comprising the light from the light source. In such case, the user U blocks the light from the light source when the user is in the detection region. Therefore, the user can be optically detected if a light intensity of the light from the light source decreases.

In still another embodiment, the optical device has no light source and no light source is provided opposite to the optical device. In such case, a reflective strip is provided opposite to the optical device, and a user blocks the ambient light reflected from the reflective strip when the user walks through the detection regions.

Therefore, following the same rule, the processing circuit of the movement direction determination system 200 may determine that at least part of the user U is in the second detection region DR2 based on the optical detection.

In one embodiment, the first detection region DR1 and the second detection region DR2 follow some specific rules. For more detail, the spaces (or named the lengths) of the first detection region DR1 and the second detection region DR2 along the X axis is larger than which are along the Y axis. For example, the space along the X axis is 5-1000 times of the space along the Y axis. Also, the space along the Z axis represents a height of the first detection region DR1 and the second detection region DR2. The X axis, Y axis and Z axis, which are perpendicular with each other, as illustrated in FIG. 2. The first detection region DR1 and the second detection region DR2 mean regions respectively viewed from the first optical device OD1 and the second optical device OD2 along the X axis. In other words, the movement of the user U is movement along the Y axis.

Figure 3:
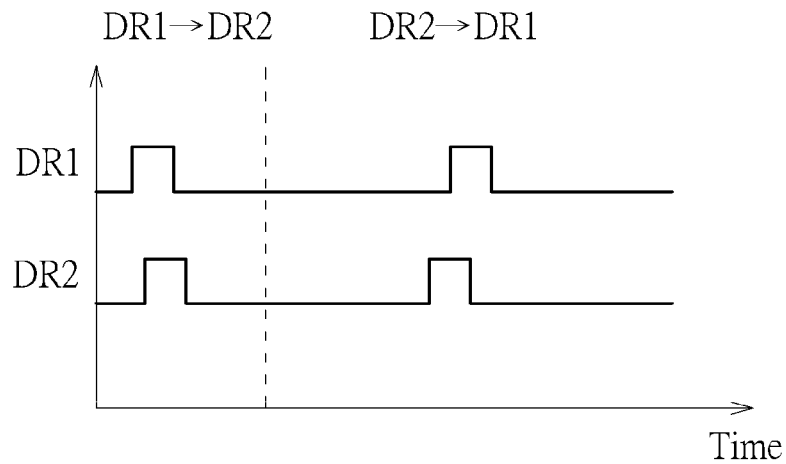
FIG. 3 is a schematic diagram illustrating how to determine a movement direction of a user, according to one embodiment of the present invention.

After determining at least part of the user U is in the first detection region DR1 and the second detection region DR2, the processing circuit can determine the movement direction of the user U. FIG. 3 is a schematic diagram illustrating how to determine a movement direction of the user U, according to one embodiment of the present invention. As illustrated in FIG. 3, the high logic level means the user U is detected in that detection region. Therefore, if the user U is firstly detected in the first detection region DR1, and then detected in the second detection region DR2, it means the movement direction of the user U is from the first detection region DR1 to the second detection region DR2. Oppositely, if the user U is firstly detected in the second detection region DR2, and then detected in the first detection region DR1, it means the movement direction of the user U is from the second detection region DR2 to the first detection region DR1.

Therefore, in view of the above-mentioned descriptions, the processing circuit can determine a movement direction of the user U according to the optical detection results, after at least part of the user U moves into the first detection region DR1 and the second detection region DR2, or after at least part of the user U passes through the first detection region DR1 and the second detection region DR2. The user U can be replaced by any other object, which will be described for more details later.

In one embodiment, the first optical device OD1 is located at a first frame F1, and the second optical device OD2 is located at a second frame F2. The first frame F1 and the second frame F2 form a gate that the user can pass through. In one embodiment, the gate can be a door between a first space and a second space. For example, the gate can be a door between a shopping mall and a road outside the shopping mall. For another example, the gate can be a door between a room in a building and a corridor. The first frame and the second frame can be real frames, for example, metal frames or plastic frames. Also, the first frame and the second frame can be different parts of a fixed object (e.g., a wall) rather than real frames.

In one embodiment, a distance between the first frame F1 and a second frame F2 is smaller than widths of the first frame F1 and a second frame F2 which are along the X axis. For example, than widths along the X axis is 5-1000 times of the distance. The distance can be identical with or different from widths of the first frame F1 and a second frame F2 which are along the Y axis.

Besides the movement direction, the processing circuit can further compute a speed of the object according to the first optical data and the second optical data. For more detail, the processing circuit records the time that the user U is detected in the first detection region DR1 and the time that the user U is detected in the second detection region DR2. If the distance between the first detection region DR1 and the second detection region DR2 is known, the speed of the user U can be computed according to the time and the distance.

Figure 4:
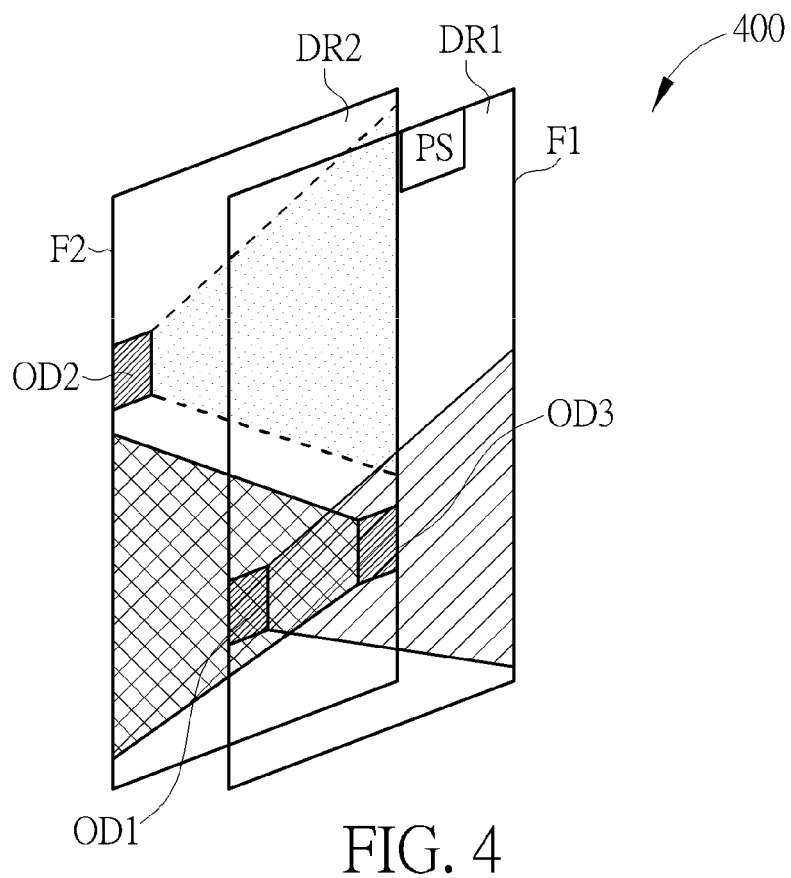
FIG. 4 is a schematic diagram illustrating a movement direction determination system according to another embodiment of the present invention.

The number and the arrangement of the optical devices are not limited to the embodiment illustrated in FIG. 2. FIG. 4 is a schematic diagram illustrating a movement direction determination system 400 according to another embodiment of the present invention. As illustrated in FIG. 4, the first detection region DR1 in the movement direction determination system 400 comprises a first optical device OD1, and the second detection region DR2 in the movement direction determination system 400 comprises a second optical device OD2, a third optical device OD3. Also, the second optical device OD2 in FIG. 4 has a detection region different from which of the second optical device OD2 in FIG. 2, which are marked by points. In one embodiment, the detection regions of the second optical device OD2 and the third optical device OD3 are overlapped. By this way, the object coordinates or object area can be computed. The computation of the object coordinates and the object areas will be described for more detail later. In one embodiment, different optical devices in FIG. 4 may have different view angles or different view areas. Further, in another embodiment, the second detection region DR2 in the movement direction determination system 400 comprises three optical devices. Therefore, the number and the arrangement of the optical devices can be set corresponding to different requirements.

As above-mentioned, the user U can be replaced by any other object. For example, the movement direction determination system is used in a factory and the user U is replaced by a product which is manufactured in the factory. Also, a conveyor passes through the first region DR1 and the second region DR2 in such example. The conveyor can be provided between two rooms. Therefore, via the movement direction determination system provided by the present invention, the movement direction of the product can be acquired, and the numbers of the products in different rooms can also be acquired based on the movement direction. In another embodiment, the movement direction determination system can be applied for a parking lot. In such case, the movement direction determination system can be used for determining whether a car is entering the parking lot or leaving the parking lot.

Figure 5:
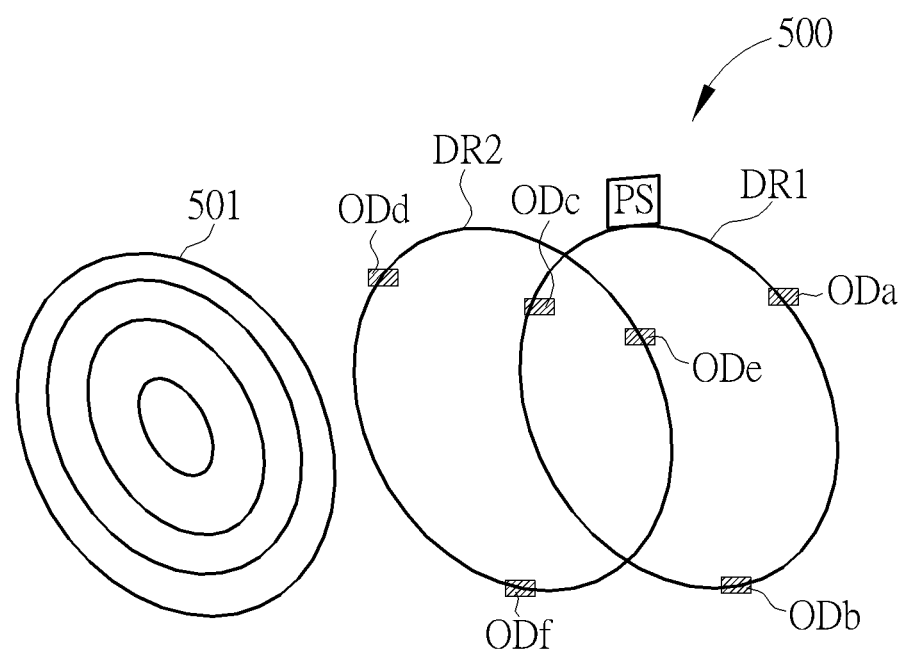
FIG. 5, FIG. 6A and FIG. 6B are schematic diagrams illustrating other applications of the movement direction determination system provided by the present invention.
Figure 6A:
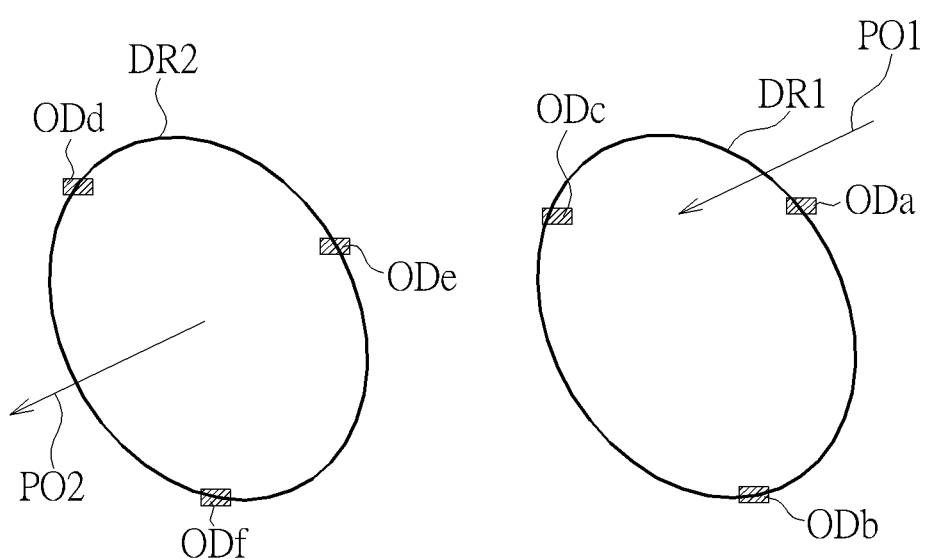
Figure 6B:
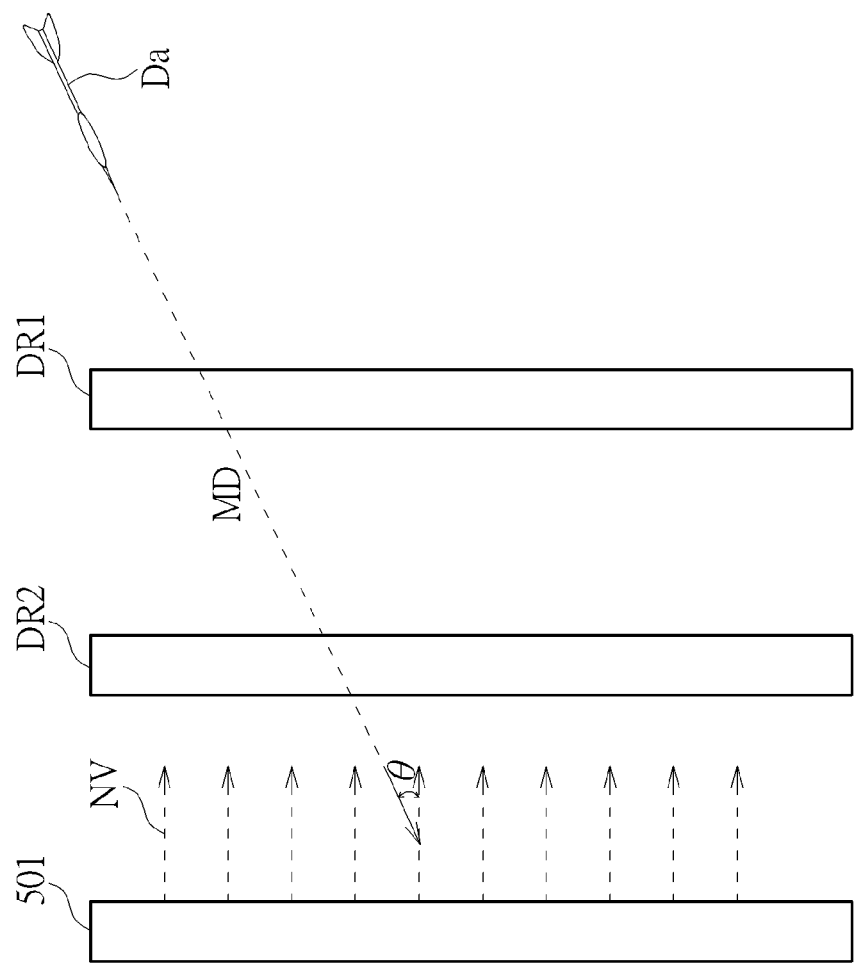

The movement direction determination system of the present invention can further be used for other applications, such as an entertainment system. FIG. 5, FIG. 6A and FIG. 6B are schematic diagrams illustrating other applications of the movement direction determination system provided by the present invention. In the embodiments illustrated in FIG. 5 and FIG. 6, the entertainment system is a dart system. Also, in the embodiments of FIG. 5, FIG. 6A and FIG. 6B, the movement direction determination system can further be used for computing the locations that the dart shoots, besides the movement direction of the dart.

As illustrated in FIG. 5, the dart system 500 comprises a dart board 501 and a movement direction determination system. The movement direction determination system, which comprises a first detection region DR1 and a second detection region DR2, is located in front of the dart board 501. The first detection region DR1 comprises optical devices ODa, ODb and ODc. Also, the second detection region DR2 comprises optical devices ODd, ODe and ODf. The movement direction of the dart shot to the dart board 501 can be computed following the above-mentioned steps.

Further, as illustrated in the embodiment of FIG. 6A, the position P1 at which the dart passes through the first detection region DR1 can be acquired by the optical data sensed by the optical devices ODa, ODb and ODc, since the dart blocks light or reflected light while passing through the first detection region DR1. The position can be acquired by various methods, for example, by triangulation location. Following the same rule, the position PO2 at which the dart passes through the second detection region DR2 can be acquired by the optical data sensed by the optical devices ODd, ODe and ODf. After acquiring the positions PO1 and PO2, the incident angle of the dart to the dart board 501 can be acquired. Then, the contact point at which the dart is shot to the dart board 501 can be anticipated based on the incident angle.

For more detail, in one embodiment, the first detection region DR1 and the second detection region DR2 respectively comprise at least three optical devices. In such case, the positions of the dart in different detection regions can be accurately computed thus the incident angle can be computed according to the positions. In one embodiment, the incident angle means a smallest angle between a movement direction of the dart and a normal vector of a front surface of the dart board 501. FIG. 6B is a side view of a combination of FIG. 5 and FIG. 6A, which is an example of the incident angle. As shown in FIG. 6B, the dart Da has a movement direction MD. An angle θ between the normal vectors NV and the movement direction MD represents the above-mentioned incident angle, which can be acquired by at the positions of the dart Da in the first detection region DR1 and the second detection region DR2.

The concept disclosed in FIG. 5, FIG. 6A and FIG. 6B is not limited to be used for an entertainment system. For example, the concept of the dart system 500 can be used in a training system such as an archery system. Further, the movement direction determination system illustrated in FIG. 5, FIG. 6A and FIG. 6B can be regarded as an incident angle determination system or a shoot point anticipation system.

Since the user U can be replaced by other objects, the movement direction determination system provided by the present invention can further comprise an object identification sensor, which is configured to identify the object. The object identification uses at least one following techniques to acquire identification information of the object: an NFC (Near Field Communication) technique, an optical data identification technique, and a barcode reading technique. The identification can be, for example, the number, the manufacturing date, or the manufacturing ingredients of the product.

Figure 7:
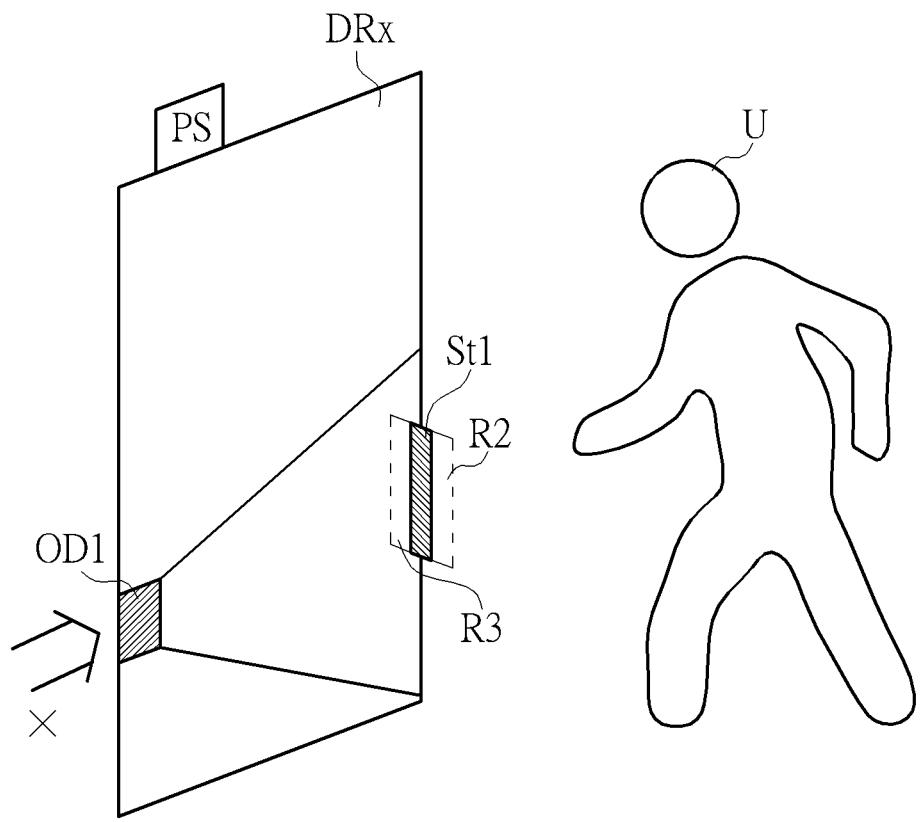
FIG. 7, FIG. 8, FIG. 9, and FIG. 10 are schematic diagrams illustrating movement direction determination systems according to different embodiments of the present invention.
Figure 7:
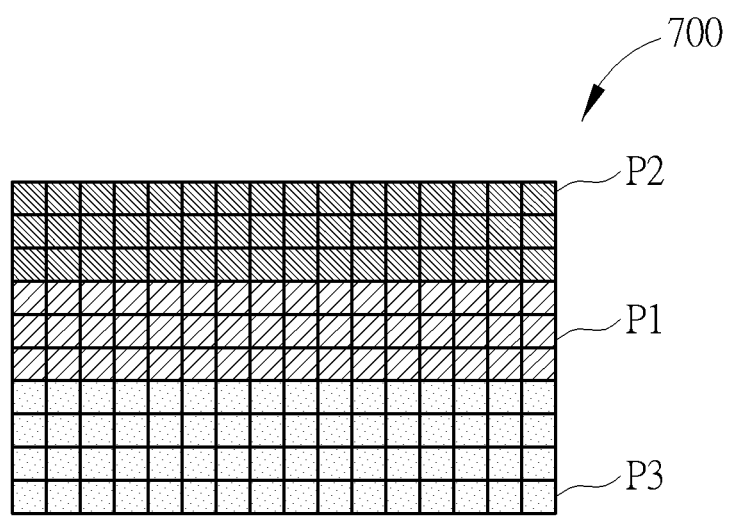

In above-mentioned embodiments in FIG. 2 and FIG. 4, two detection regions are used for determining the movement direction of the user U. However, in one embodiment, the movement direction can be determined via only one detection region. FIG. 7, FIG. 8, FIG. 9, and FIG. 10 are schematic diagrams illustrating movement direction determination systems according to different embodiments of the present invention. As illustrated in FIG. 7, the movement direction determination system comprises the detection region DRx which comprises an optical device ODx and a first reflective strip St1. The optical device ODx can comprise the structure illustrated in FIG. 1. Therefore, the light source in the optical device ODx is configured to emit light. Also, the optical sensor in the optical device ODx is configured to sense optical data 700 (an image in this example) generated based on reflected light of the light. The optical data 700 comprises a first part P1 corresponding to the first reflective strip St1, a second part P2 and a third part P3. The second part P2 and the third part P3 are at different sides of the first part P1 and respectively correspond to the regions R2 and R3 nearby the first reflective strip St1.

Please note, in the embodiments illustrated in FIG. 7, FIG. 8, FIG. 9 and FIG. 10, for the convenience of explaining, the optical data 700 is rotated for 90°, thus the regions R2 and R3 are respectively at an left region and a right region of the first reflective strip St1, but the second part P2 and the third part P3 are respectively at an upper region and a lower region of the first part P1. The processing circuit of the movement direction determination system determines a movement direction of the user U according to relations between user optical data in the optical data 700 and the first part P1, the second part P2, third part P3.

Figure 8:
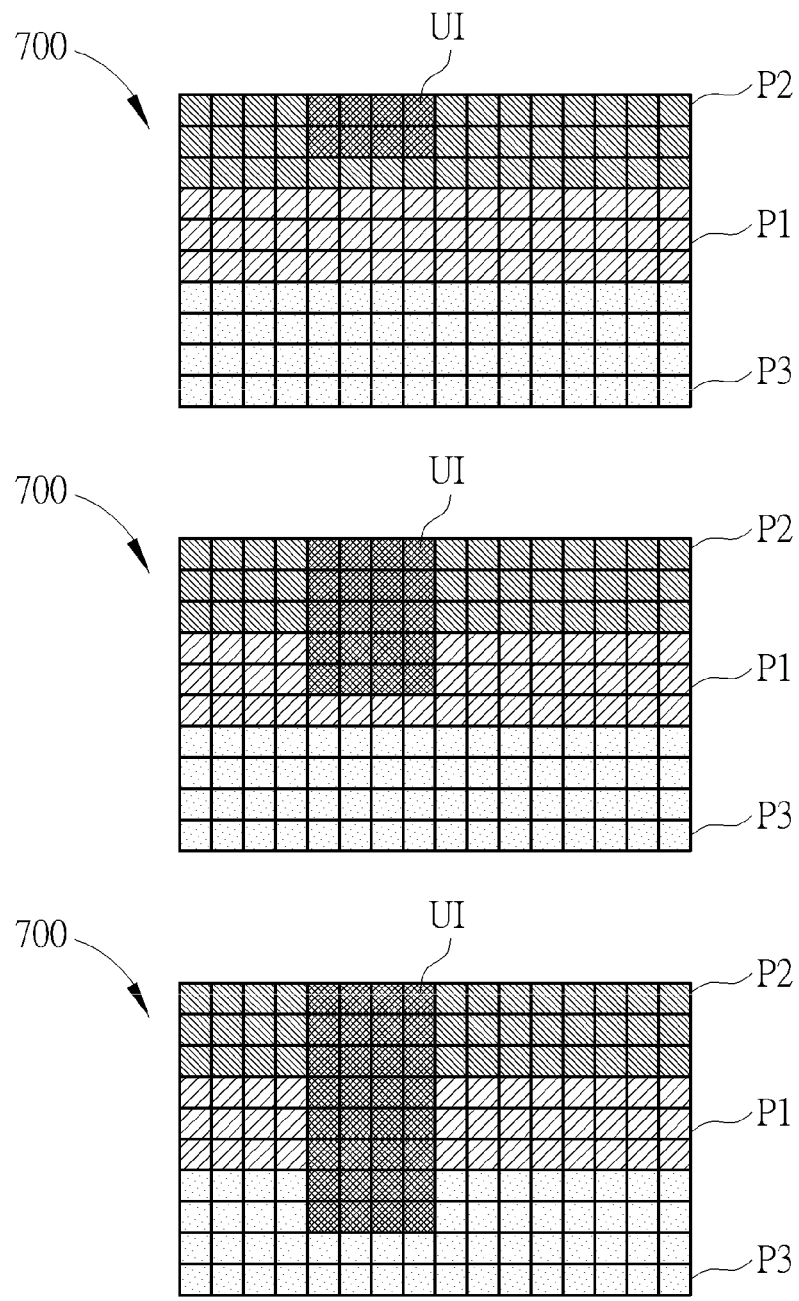
Figure 9:
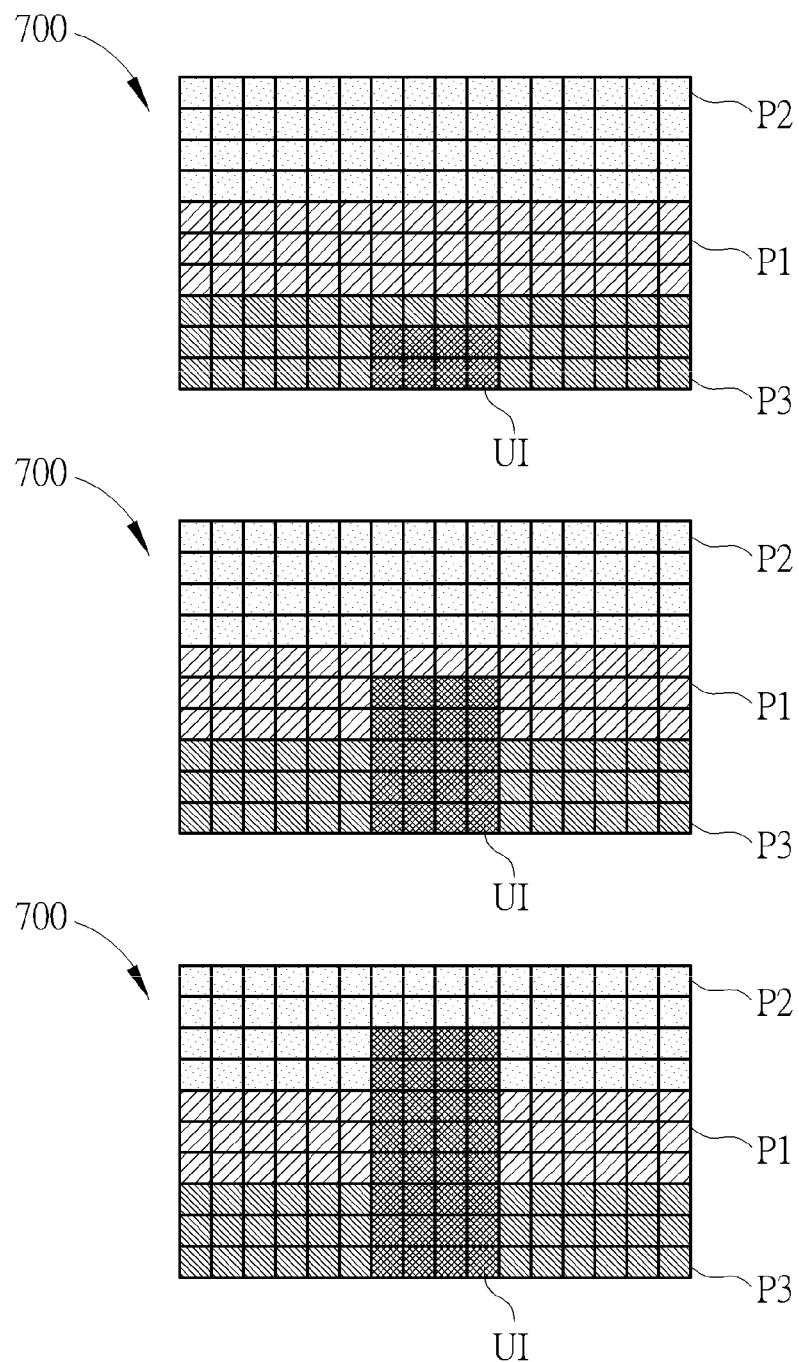
Figure 10:
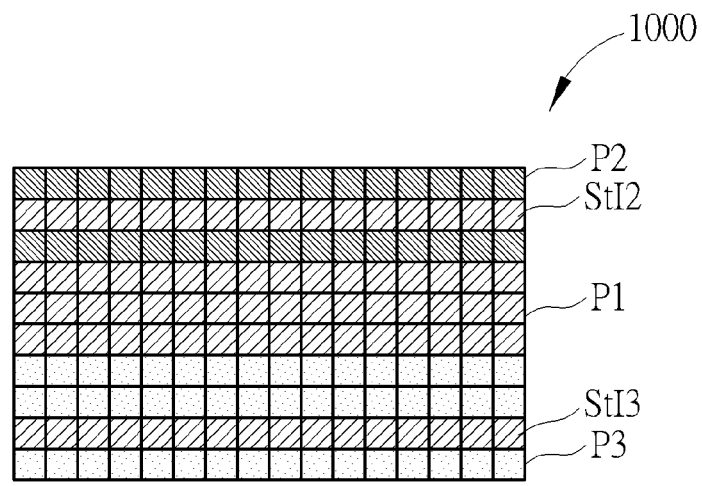

Please refer to FIG. 8, in which the optical data 700 comprises user optical data UI. As shown in FIG. 8, from up to down, the user optical data UI firstly appears in the second part P2, then moves into the first part P1, and then moves into the third part P3. Therefore, the movement direction of the use U in FIG. 7 is region R2→the first reflective strip St1→region R3. Further, in FIG. 9, the user optical data UI firstly appears in the third part P3, then moves into the first part P1, and then moves into the second part P2. Therefore, the movement direction of the use U in FIG. 7 is region R3→the first reflective strip St1→region R2.

In one embodiment, the second part P2 corresponds to a second reflective strip, and the third part P3 corresponds to a third reflective strip. For more detail, the region R2 in FIG. 7 comprises a second reflective strip and the region R3 in FIG. 7 comprises a third reflective strip. Therefore, the optical sensor in the optical device ODx senses optical data 1000 comprising optical data STI2 corresponding to the second reflective strip and optical data STI3 corresponding to the third reflective strip. Via the second reflective strip and the third reflective strip, the movement of the user U can be detected more easily.

In one embodiment, the optical device ODx is located at a frame, which means the light source and the optical data optical sensor in the optical device ODx are located at the frame. The frame forms a gate that the user U can pass through. The second part P2 corresponds to a first side of the gate (i.e., the region R2), and the third part P3 corresponds to a second side of the gate (i.e., the region R3). Also, the gate can be a door between a first space and a second space. The examples of the first space and the second space are described in above-mentioned descriptions, thus are omitted for brevity here.

Please note, the shape, the size or the arrangement of the regions R2, R3, the first reflective strip St1, the first part P1, the second part P2, and the optical data STI2. STI3 are not limited to the embodiments illustrated in FIG. 7, FIG. 8, FIG. 9 and FIG. 10.

The user U in the embodiments of FIG. 7, FIG. 8, FIG. 9 and FIG. 10 can also be replaced by other objects. Accordingly, the movement direction determination system can further comprise an object identification sensor, configured to identify the object. The object identification uses at least one following techniques to acquire identification information of the object: an NFC technique, an optical data identification technique, and a barcode reading technique. The identification can be, for example, the number, the manufacturing date, or the manufacturing ingredients of the product.

Besides the movement direction, the above-mentioned movement direction determination system can further to compute a speed of the user U. In one embodiment, the first detection region DR1 and the second detection region DR2 are respectively provided on the first frame F1 and the second frame F2 illustrated in FIG. 2 and FIG. 4. In such case, the speed is computed according to a time difference between the time at which the user U is detected in the first detection region DR1 and the time at which the user U is detected in the second detection region DR2, and according to a distance between the first frame F1 and the second frame F2.

In another embodiment, an object motion sensor, which is different from the first optical device OD1 and the second optical device OD2, can be provided on one of the first frame F1 and the second frame F2. The object motion sensor is configured to compute movement information which corresponds to the user U moves across the detecting region. The speed of the user U can be computed based on such movement information and a distance between the user U and the object motion sensor.

For more detail, the object motion sensor is a device which can detect a location and a track of an object. In one embodiment, the object motion sensor comprises a light source configured to emit light, and computes the location and the track of the object based on frames generated based on the light. Therefore, if the object motion sensor detects the user U appears in the detection area thereof and an area of the detection area is known, the object motion sensor can acquire the virtual speed of the user U. The virtual speed is the speed of the user in the image. In one embodiment, the object motion sensor OM has a pre-set frame rate and can acquire the time that the user U passes through the detection area based on the frame rate. For example, if the object motion sensor captures 100 frames per second and the user U appears in 20 frames, the object motion sensor can acquire that the time that the user U passes through the detection area is 20/100 second. Thus the virtual speed can be computed according to the area (the size) of the detection area and the time that the user U passes through the detection area. After that, the processing circuit computes the real speed of the user according to a distance between the user U and the object motion sensor, and according to the virtual speed. In one embodiment, the object motion sensor computes the real speed via an optical flow algorithm, but not limited.

Figure 11:
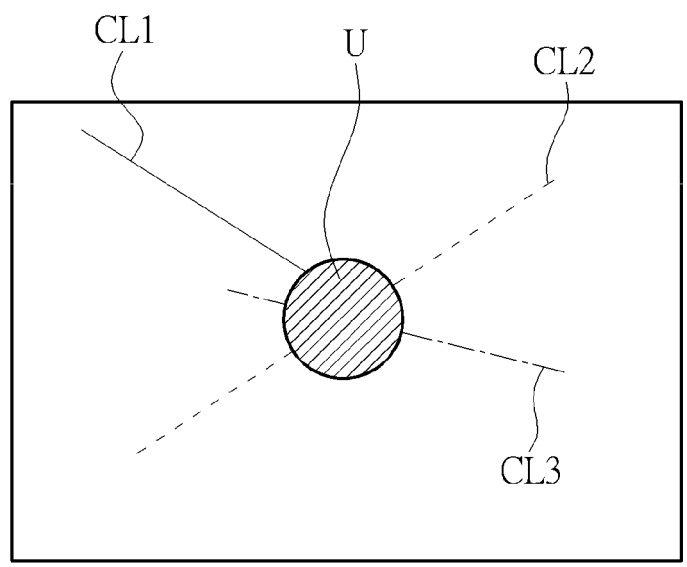
FIG. 11 is a schematic diagram illustrating an example of computing a position of the user.

The distance between the user U and the object motion sensor can be acquired by various methods. In one embodiment, the distance is acquired by a conventional distance measurement device such as a proximity sensor or a TOF (Time of Flight) device. In another embodiment, the distance between the user U and the object motion sensor is computed based on the image sensed by at least three optical devices provided on one frame. As illustrated in FIG. 11, three object devices are provided on one frame and three centroid lines CL1, CL2 and CL3 can be acquired based on the images captured by the object devices. In such case, a position of the user U can be computed based on the centroid lines CL1, CL2 and CL3. Such position computation algorithm can also be applied to the embodiments illustrated in FIG. 5, FIG. 6A and FIG. 6B.

Figure 12A:
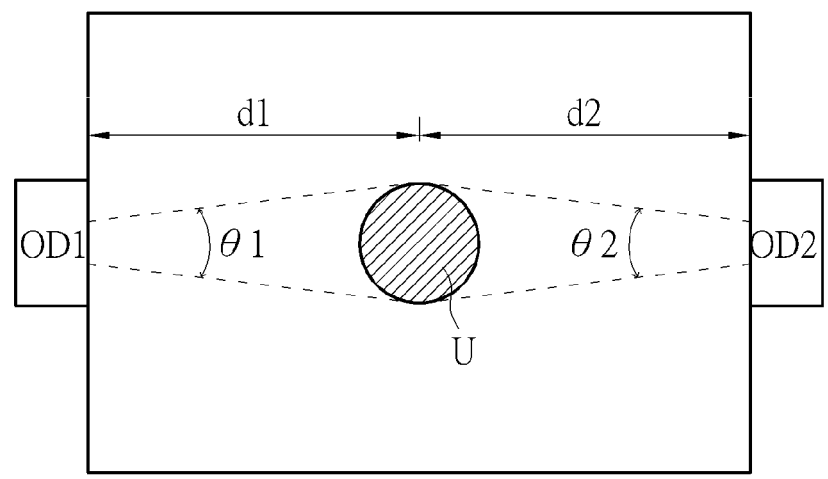
FIG. 12A and FIG. 12B are schematic diagrams illustrating an example of computing a volume of the user.
Figure 12B:
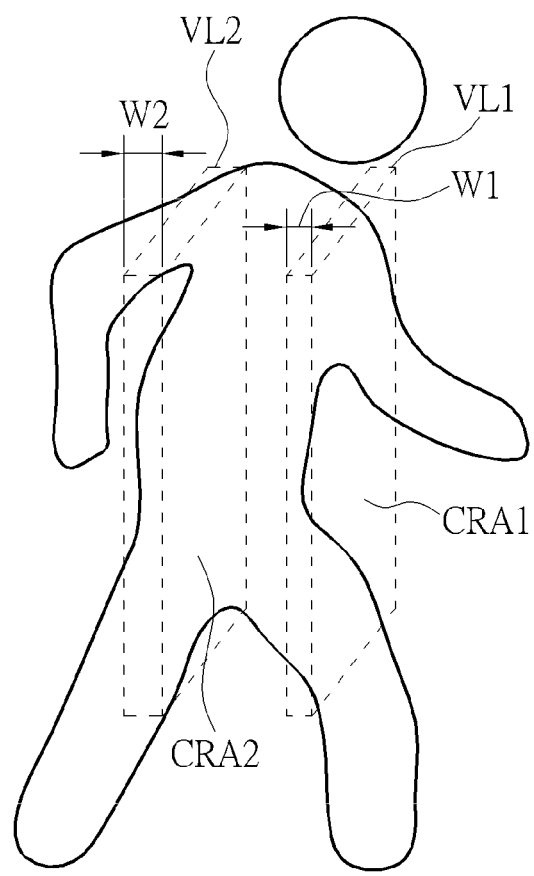

After the speed of the user U is acquired, the volume of the user can also be computed. In one embodiment, the volume can be computed according to the speed of the user U and cross-sectional areas of the user U. FIG. 12A and FIG. 12B are schematic diagrams illustrating an example of computing a volume of the user. Please note, the two optical devices OD1, OD2 used in the embodiment of FIG. 12A are only for explaining, the volume can be acquired via only one optical device. As illustrated in FIG. 12A, angles θ1, θ2 which represent the cross-sectional areas of the user U can be respectively acquired based on the images captured by the optical devices OD1 and OD2 and the first detection region DR1. Also, the distances d1 and d2 respectively between the optical device OD1 and the user U and between the optical device OD2 and the user U can be acquired by above-mentioned distance measuring devices.

Please refer to FIG. 12B, the angle θ1 represents the cross-sectional area CRA1, and the angle θ2 represents the cross-sectional area CRA2. The real sizes of cross-sectional area CRA1 and the cross-sectional area CRA2 can be transformed to real values since the distances d1 and d2 are acquired.

In such case, if the widths W1 and W2 are acquired, the volume VL1 and the volume VL2 can be acquired. The widths W1 and W2 can be computed according to the speed of the user U. In one embodiment, the width is proportional to the speed. For example, if the cross-sectional area CRA1 is acquired in one image and the speed of the user U is slow, a smaller width W1 is acquired based on the speed and a frame rate of the optical device OD1. For another example, if the cross-sectional area CRA2 is acquired in one image and the speed of the user U is fast, a larger width W1 is acquired based on the speed and a frame rate of the optical device OD2.

Therefore, in the embodiments of FIG. 12A and FIG. 12B, the user U has different speeds when the cross-sectional area CRA1 is acquired and the cross-sectional area CRA2 is acquired, thus the widths W1, W2 are different. Then, the volume VL1 can be computed according to the cross-sectional area CRA1 and the width W1, and the volume VL2 can be computed according to the cross-sectional area CRA2 and the width W2. Following these steps, if a plurality of cross-sectional areas are acquired and corresponding widths are acquired, the volume of the user U can be computed. The more cross-sectional areas and corresponding widths are acquired, the more accurate volume of the user U can be acquired.

Figure 13:
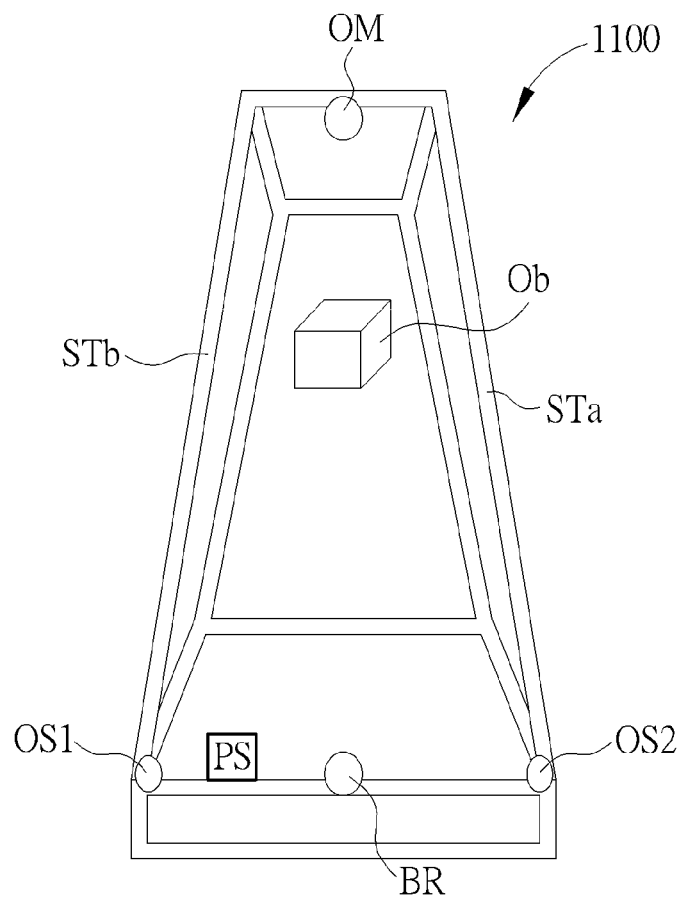
FIG. 13 is a schematic diagram illustrating an object volume computation system according to one embodiment of the present invention.

The present invention further provides an object volume computation system. FIG. 13 is a schematic diagram illustrating an object volume computation system according to one embodiment of the present invention. In FIG. 13, the object volume computation system 1100, which is provided in a shopping cart in this embodiment and is used for computing a volume of an object Ob when the object passed a detection area, comprises at least one object sensing device (two object sensing devices OS1 and OS2 in this embodiment), an object motion sensor OM and a processing circuit PS, which can communicate with the object sensing devices OS1, OS2 and the object motion sensor OM. Please note, the object volume computation system can be provided to any container besides the shopping cart, such as a shopping basket or a box. Also, the processing circuit can be a circuit or a chip independent from the object sensing devices OS1, OS2 and the object motion sensor OM, but can also be integrated thereto.

The object sensing devices OS1, OS2 are configured to sense first optical data of the object Ob. The object sensing devices OS1, OS2 generates information representing an area of the object Ob according to the first optical data. The object motion sensor OM is configured to compute movement information which corresponds to the object Ob moves across the detection area. Also, the processing circuit further computes a distance between the object Ob and the optical motion sensor OM based on the first optical data, computes a height of the object Ob according to the distance and the movement information, and acquires the volume based on the area and the height.

For more detail, the object motion sensor OM is a device which can detect a location and a track of an object. In one embodiment, the object motion sensor OM comprises a light source configured to emit light, and computes the location and the track of the object based on frames generated based on the light. Therefore, if the object motion sensor OM detects the object Ob appears in the detection area thereof and an area of the detection area is known, the object motion sensor OM can acquire the speed of the object Ob. In one embodiment, the object motion sensor OM has a pre-set frame rate and can acquire the time that the object Ob passes through the detection area based on the frame rate. For example, if the object motion sensor OM captures 100 frames per second and the object Ob appears in 20 frames, the object motion sensor OM can acquire that the time that the object Ob passes through the detection area is 20/100 second. After that, the processing circuit computes the height according to the speed and a time that the object Ob passes through the detection area. In one embodiment, the object motion sensor OM computes the speed via an optical flow algorithm, but not limited.

The object sensing devices OS1, OS2 can comprise the structure illustrated in FIG. 1. Therefore, in the embodiment of FIG. 13, the object volume computation system 1100 further comprises reflective strips STa and STb to assist object sensing of the object sensing devices OS1, OS2. However, the light source can be provided opposite to the optical sensor rather than at the same side, as illustrated in the embodiment of FIG. 2. Many methods can be applied for generating information representing the area of the object Ob according to the first optical data via the object sensing devices OS1, OS2.

Figure 14:
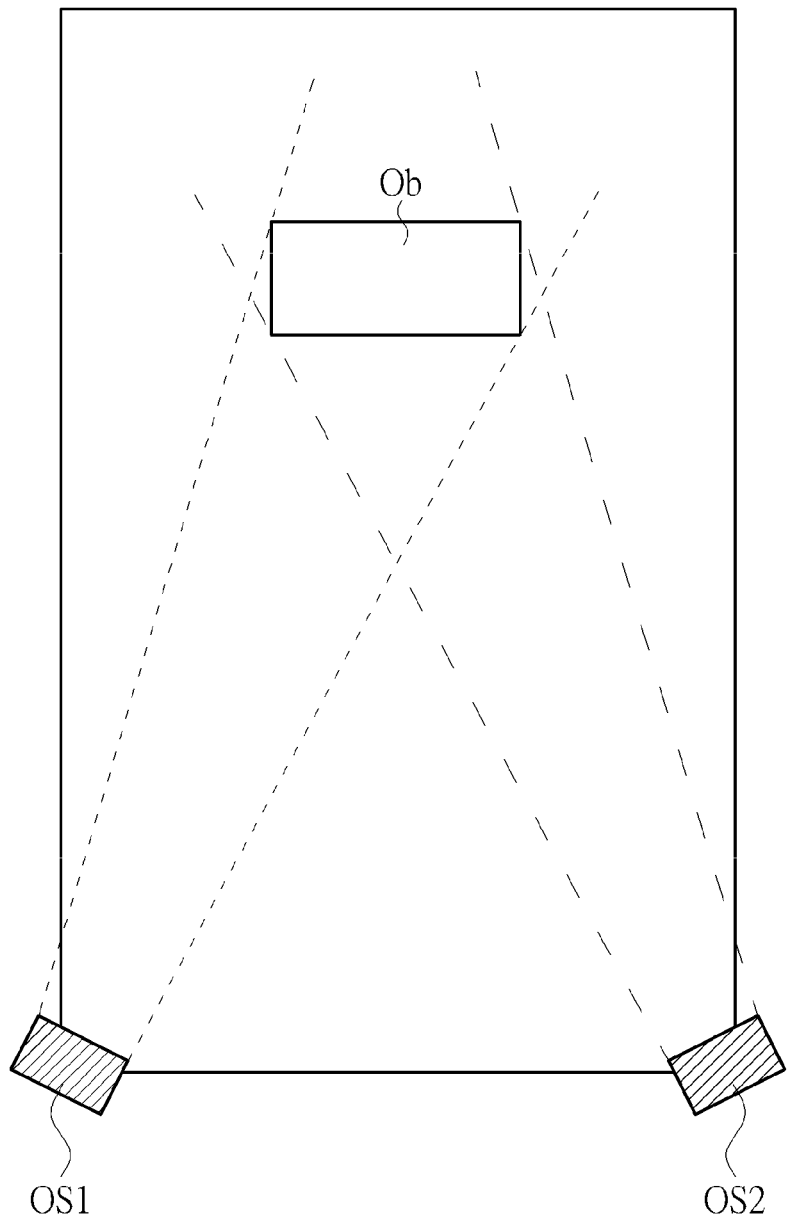
FIG. 14 is a schematic diagram illustrating how to compute a width of the object according to one embodiment of the present invention.

In one embodiment, the object sensing devices detects a plurality of widths of the object in different view angles, wherein the processing circuit computes the area based on the widths. FIG. 14 is a schematic diagram illustrating how to compute a width or an area of the object according to one embodiment of the present invention. As illustrated in FIG. 14, the object sensing devices OS1, OS2 senses optical data of the object Ob in different vie angles (i.e., in different perspectives, in different angle ranges). Therefore, the widths can be acquired based on the optical data of the object Ob. In one embodiment, the processing circuit computes the area based on a maximum one of the widths or an average of the widths.

In another embodiment, the processing circuit classifies the widths into a plurality of groups of widths, and computes the areas in different one of the view angles based on the groups of widths. For example, in the embodiment of FIG. 14, the widths are classified to two groups: widths acquired by the object sensing device OS1 and widths acquired by the object sensing device OS2. After that, the processing circuit computes an area based on the widths acquired by the object sensing device OS1 and an area based on the widths acquired by the object sensing device OS2. The final area can be computed based on these areas. For example, the final area can be an average of these areas, or a maximum one/a minimum one of these areas.

As above-mentioned, the processing circuit computes a distance between the object Ob and the optical motion sensor OM based on the first optical data. In one embodiment, the first optical data comprising optical data of the optical motion sensor OM and optical data of the object Ob, and the processing circuit computes the distance based on the optical data of the optical motion sensor OM and the object optical data. For example, the distance between the optical motion sensor OM and the object sensing device OS1 is known. Also, the first optical data sensed by the object sensing device OS1 comprises optical data of the optical motion sensor OM and optical data of the object Ob. The processing circuit computes a centroid of the optical data of the object Ob and computes the distance between the object Ob and the optical motion sensor OM based on the centroid and the optical data of the optical motion sensor OM. However, the distance mentioned in FIG. 14 is not limited to be computed via these steps.

Also, numbers or arrangements of the object sensing devices OS1, OS2 and the optical motion sensor OM are not limited to the embodiment illustrated in FIG. 13. For example, the numbers and the locations of the object sensing devices OS1, OS2 can be changed corresponding to different requirements. In one embodiment, the object sensing device is located at a location which has a largest distance from a middle point of the container in which the object sensing device is provided. Further, in another embodiment, the object sensing devices are located at corners of the container.

Please refer to FIG. 13 again, in one embodiment, the object volume computation system further comprises a size information reader BR configured to read product size information of a product. The processing circuit further compares the size information corresponding to the volume, which are acquired in above-mentioned steps, with the product size information, to determine whether the object is the product. Please note, the step of "compares the size information with the product size information" mentioned here can mean compare the whole volume of the product with the computed volume, but also can mean compare at least two of the width, the length and the height of the product with at least two of the width, the length and the height which are computed in above-mentioned embodiments.

In one embodiment, the product size information is tied together with a product price, and the size information reader BR is a barcode reader. Therefore, if the user in an unstaffed store wants to buy a product, he needs to scan the barcode on the product and pay the price contained in the barcode, or he could not take the product and leave the unstaffed store. In such case, the product size information will also be acquired and is compared with the size information acquired in above-mentioned embodiments. If a difference of the product size information and the computed size information is smaller than a predetermined level, it may mean the user really take the product he scanned to pay. Oppositely, if a difference of the product size information and the computed size information is larger than a predetermined level, it may mean the user takes another product to pretend the product he scanned.

In view of above-mentioned embodiments, movement direction determination systems which can determine a movement direction of the object or an incident angle of the object are provided. Such movement direction determination systems can be used in various scenarios since the arrangement thereof can be freely changed. Besides, the object volume computation system provided by the present invention can be used in an unstaffed store, to enhance to product confirming mechanism.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A movement direction determination system, comprising:
   a first detection region, comprising:
      a first optical sensor configured to sense first optical data;
   a second detection region, comprising:
      a second optical sensor configured to sense second optical data; and
   a processing circuit, configured to determine a movement direction of an object according to the first optical data and the second optical data, after at least partial of the object moves into the first detection region and the second detection region, or after at least partial of the object passes through the first detection region and the second detection region;
   wherein a direction which the first detection region and the second detection region are along is perpendicular with the movement direction;
   wherein the first detection region and the second detection region do not comprise an identical region;
   wherein the processing circuit further computes a speed of the object according to a time that the object is detected in the first detection region and a time that the object is detected in the second detection region.

2. The movement direction determination system of claim 1, wherein the first optical sensor is located at a first frame, and the second optical sensor is located at a second frame, and wherein the first frame and the second frame form a gate that the object can pass through.

3. The movement direction determination system of claim 2, wherein the first frame and the second frame are different parts of a fixed object.

4. The movement direction determination system of claim 1, wherein a number of the first optical sensor is 1, and a number of the second optical sensor is larger than 1.

5. The movement direction determination system of claim 1, wherein the processing circuit further computes a volume of the object according to the speed and cross-sectional areas of the object.

6. The movement direction determination system of claim 1, further comprising:
   an object identification sensor, configured to identify the object.

7. The movement direction determination system of claim 6, wherein the object identification uses at least one following techniques to acquire identification information of the object: an NFC technique, an optical data identification technique, and a barcode reading technique.

* * * * *